United States Patent [19]
Askeland et al.

[11] Patent Number: 5,485,180
[45] Date of Patent: Jan. 16, 1996

[54] INKING FOR COLOR-INKJET PRINTERS, USING NON-INTEGRAL DROP AVERAGES, MEDIA VARYING INKING, OR MORE THAN TWO DROPS PER PIXEL

[75] Inventors: Ronald A. Askeland; Catherine B. Hunt, both of San Diego; Keshava A. Prasad, San Marcos; Corrina A. E. Hall, Escondido, all of Calif.; Mark S. Hickman, Vancouver, Wash.; Lance Cleveland, San Diego, Calif.; William J. Allen, Portland, Oreg.

[73] Assignee: Hewlett-Packard Company, Palo Alto, Calif.

[21] Appl. No.: 56,263

[22] Filed: Apr. 30, 1993

Related U.S. Application Data

[63] Continuation-in-part of Ser. No. 926,264, Aug. 5, 1992.
[51] Int. Cl.[6] .................................... B41J 2/205
[52] U.S. Cl. .............................. 347/15; 347/43; 358/298; 358/518
[58] Field of Search .................... 347/9, 12, 15, 347/43, 13; 358/502, 518, 519, 298

[56] References Cited

U.S. PATENT DOCUMENTS

| | | | |
|---|---|---|---|
| 4,528,576 | 7/1985 | Koumura et al. | 347/15 |
| 4,672,432 | 6/1987 | Sakurada et al. | 347/43 X |
| 4,943,813 | 7/1990 | Palmer et al. | 347/41 |
| 4,963,882 | 10/1990 | Hickman . | |
| 4,967,203 | 10/1990 | Doan et al. . | |
| 5,012,257 | 4/1991 | Lowe et al. . | |

FOREIGN PATENT DOCUMENTS

1-174456  7/1989  Japan ..................................... 347/15

*Primary Examiner*—Benjamin R. Fuller
*Assistant Examiner*—John E. Barlow, Jr.

[57] ABSTRACT

At least one certain primary or secondary color is established that receives special treatment for at least one printing medium. Such treatment may include (1) using more than two drops of primaries per pixel for binary printing of a particular secondary; or (2) binary-printing the chromatic primary or secondary—but not other hues—after rendition, by use of a "superpixel"; or (3) application of, in effect, a nonintegral number, greater than one, of ink drops per pixel; or (4) combinations of these treatments. As an example of the first of these treatments—using inks optimized for plain paper at one drop of ink for primaries and two (one of each of two primaries) for secondaries—red is printed on transparency film as one drop of yellow ink and two of magenta in each pixel. As to the second treatment, the superpixel is preferably a group of pixels (e.g., a two-by-two array) including the target pixel, in which group each pixel is inked and at least one pixel receives at least two drops of ink.

24 Claims, 2 Drawing Sheets

INKING FOR COLOR-INKJET PRINTERS, USING NON-INTEGRAL DROP AVERAGES, MEDIA VARYING INKING, OR MORE THAN TWO DROPS PER PIXEL

This is a continuation-in-part of U.S. utility-patent application Ser. No. 07/926,264, filed Aug. 5, 1992, in the name of William J. Allen. That document in its entirety is incorporated by reference into this one.

Related copending applications commonly owned by the assignee of the present document and also incorporated by reference in their entirety into this application are U.S. utility-patent applications Ser. Nos. 07/878,579 and 07/878,931, both filed on May 4, 1992, and issued Jul. 26, 1994, and Dec. 27, 1994, respectively as U.S. Pat. Nos. 5,333,243 and 5,377,024 . A closely related document is another U.S. utility-patent application filed in the United States Patent and Trademark Office substantially contemporaneously with this document, in the name of Lance Cleveland, and utility-patent application Ser. No. 08/056,633 also hereby incorporated by reference in its entirety into this document.

BACKGROUND

1. Field of the Invention

This invention relates generally to printing color images by construction from individual ink drops deposited in pixel arrays; and more particularly to creation of such images by inkier operation on a printing medium whose hue or saturation response, or both, depart from the responses of ordinary paper. Certain aspects of our invention are particularly pertinent to binary printing operation, and even more particularly relevant in the context of three-binary-bit color reproduction.

2. Prior Art

Printing with primaries and secondaries

In this well-known technology, color printing is controlled by programmed digital microprocessors. In each apparatus one or more processors operate pens loaded with ink of three so-called "primary" colors—most commonly cyan, magenta and yellow.

Printing any of these three colors is accomplished simply by depositing ink of the desired color. So-called "secondary" colors—ordinarily green, blue and red—are printed by combinations of the primaries.

More specifically, printing of any one of the secondaries (green, for example) is done by overprinting two primaries (traditionally equal quantities of cyan and yellow, for the same example). The secondary is created by the subtractive process of spectral absorption.

Commonly, still another pen is loaded with black ink to provide black and gray effects. This aspect of the printing process may not be of direct interest in regard to the present invention and so will receive little mention in the remainder of this document.

Binary operation, and number of bits in the system

By "binary" we refer to the well-known concept of either having or not having a fixed unitary quantity of something. In this context it means either printing or not printing in each pixel location a particular primary or secondary color—in an essentially unvarying amount.

This concept is sometimes summarized with the phrase "go/no-go". In other words, either the system enters a "go" mode of operation—with respect to a particular primary or secondary color—in which it may be said to "go ahead and print" some specific, fixed quantity of that particular color; or it enters a "no-go" mode in which it does not print that color at all.

Not all pixel-array printing systems operate in this way. To the contrary, some systems use a multiple-level approach, in which many different quantities of ink (of one or several colors) can be deposited at each pixel.

The point of those other systems is to establish a multiple-level saturation scale, or—viewed in a mono-chrome sense with respect to each color independently—a multiple-gray-level scale, which can be implemented for each color at each pixel. A multilevel system must be implemented by multilevel data processing in the microprocessor that controls the pens.

In an ordinary programmed digital microprocessor, such multiple-level data are necessarily represented in multiple-bit form. Although each bit used to express the quantity of ink of course remains binary (go or no-go), the overall quantity itself is now truly susceptible to quantification—that is, expression in gradations on a scale.

In a multilevel system the multiple-bit information processing and the multiple-ink-drop physical control required are both very demanding. Furthermore these provisions are required ineachchannel—in other words, required at least for each of the primaries that are employed by the system, and in some operational philosophies each of the secondaries too.

A system using, for example, five-bit levels to distinguish $2^5=32$ saturation gradations in each of three different channels (primary-color inks) is overall at least a seven-bit system. At least two bits must be used to identify which ink is to be controlled by the five "level" bits.

For simplicity of operation it may be preferred instead to use three bits for identification—thus allowing the system to work in the six primaries and secondaries (plus black and white) rather than three (or four) inks. Thus an optimum five-bit-level (thirty-two-gradation) system may be an eight-bit system overall.

Such systems are capable, at least in principle, of greater hue and saturation fidelity, particularly for very fine features of images. They require, however, either longer operating times or microprocessors and system-bus architectures capable of handling a greater number of bits in parallel—or both.

Of course such systems are available, and new ones are readily designed for the purpose; and they are less costly nowadays than previously. They remain, however, expensive.

Even these data-processing provisions are not the end of the matter, for fine physical control of inking is needed to implement such a system reliably. Such physical provisions, especially under varying environmental conditions, remain very touchy or temperamental.

Accordingly for such performance a price must be paid. Ordinarily it is paid in terms of printing speed, drying time, apparatus complexity and cost, price to the end-user, sometimes uniformity of results, etc.

One known system that employs a thirty-two-increment scale—that is to say, up to thirty-two small drops per pixel—is known as the Hertz technology. In that system a piezoelectrical crystal vibrates a droplet of ink, while the system either does or does not electrically charge the droplet.

Applying a charge enables the droplet to escape from the vibrator with momentum imparted by the vibration. Thus this particular system, in addition to being a multilevel, multibit system does not operate by thermal-inkier technology; moreover, the drops are used to express complex colors, rather than primaries or secondaries.

Our invention is addressed to refinements that very closely approximate such high-color-fidelity performance—but in a device that is vastly simpler and more functionally efficient, and therefore economical. Thus our invention aims to solve a problem that in the past has obstructed achievement of high-quality but inexpensive color reproduction.

Another technology which superficially may seem to be related to ours in that it deals with depositing multiple ink "dots" or drops—notably drops ofdifferentdensity—within a given "picture element" is U.S. Pat. No. 4,672,432, of Sakurada. Each drop is either full-density of one-quarter of full-density.

In Sakurada moreover, each "picture element" is not a pixel but rather a three-by-three matrix of pixels; and the multiple dots are neveroverprinted but rather only adjacently printed in adjacent pixels of each "picture element". This is shown in the Sakurada patent particularly by the unavailability of patterns for tone levels 31, 34 and 35: if overprinting were permitted in that system, patterns would be available for those level.

Hence Sakurada's total inking in each nine-pixel (three-by-three) matrix is always at most equal to—and usually much less than—nine times the amount of ink in one full-density ink drop. Thus on average the inking is some fraction $f \leq 1$ of a single full-density dot.

Sakurada's system provides thirty-three different tone levels for each color unit, and is thus distinctly a multilevel system. He also, however, permits mixing inks within each three-by-three matrix for the purpose of creating complex colors within each matrix—and so is at the same time a multihue system; such a system is a form of, or a substitute for, the so-called "rendition" process discussed in the following subsection.

U.S. Pat. No. 5,012,257 of Lowe etal. describes a system for inkjet printing on paper, in which two-by-two groups called "superpixels" are used for preestablishing certain color combinations, or complex colors, that can be called for as a unit. Unlike Sakurada, Lowe uses ink drops of all the same density and size; due to this fact, as well as the fact that each of Lowe's pixel groupings has only 4/9 as many pixels as Sakurada's, Lowe's system provides many times fewer levels of overall inking density, but it is nevertheless a multiple-level system.

In Lowe, at most two pixels in each two-by-two superpixel are printed—which is to say that at least two are blank, or white (for white paper). Also Lows uses no more than two drops per pixel, or three drops per two-by-two superpixel. Therefore in Lows the number of drops per pixel on average is always less than one, and in fact is at most three-quarters.

The Sakurada and Lows inventions thus provide what might be characterized as a hue-on-demand system. Such a system may for instance work out the hue desired at a given pixel, and then select the closest available hue—provided by the multiple-hue selections of the three-by-three or two-by-two pixel grouping.

The hue selection is thus performed on a pixel-group basis, or in other words for an entire pixel group as the basic unit of color, rather than for each pixel individually. As already noted above in relation to Sakurada, this is a substitute for—or form of—rendition.

Still another technology of interest, but of even more-superficial similarity, is disclosed in U.S. Pat. No. 4,528,576 of Koumura. That document contains diagrams showing three colors seemingly stacked or overprinted. Careful reading, however, suggests that those diagrams are merely figurative representations of the sequence in which colors— any two colors—are put down and layered, ifandwhentheyareputdown; it is not believed that Koumura intends to convey that all three colors ever would actually be put down on a single pixel.

Mapping primary and secondary colors to inks

The present document focuses upon an operational stage that is between (1) the selection of a primary or secondary color, and (2) the physical printing process. In other words this invention addresses the stage of determining which ink to discharge (or to put it another way which pen should fire)—and how much of that ink to discharge, and where to discharge it—to implement a specific primary or secondary color at a specific location.

More succinctly, we are mapping primary or secondary colors to primary inks, on a small-scale (single pixel or nearly so) basis.

To assist in recognizing differences between certain aspects of our invention and the prior art, however, we will briefly digress to describe a function known as rendition.

Direct representation vs. rendition

In printers of the type under consideration in this document, microprocessor programs implement the ink applications needed to produce a desired color effect at each part of an image. The decision to print a particular primary or secondary color at a particular pixel is made in one of two ways:

(a) sometimes the decision follows directly from the desired or so-called "input" color of a desired image at that pixel location—in other words, sometimes a user calls directly for a primary or secondary color there; and (b) sometimes the selection of a particular primary or secondary is the result of a complicated resolution of a complex color at each pixel location into component primary and secondary fractions—and then in effect implementing those fractional representations by a real distribution, in a progressive assignment procedure called "rendition" and sometimes employing a propagating process called "error diffusion".

The second type of decision-making is used to produce, for example, a recognized color blend such as chartreuse, or an undefined color needed to match the appearance of a scanned photograph. Details of various approaches to rendition and error diffusion which lead to such selectionof a primary or secondary for printing—as well as the physicalprinting process itself—appear in the related patent documents that are identified above and incorporated into this document by reference.

The term "rendition" is now used in the color industry to mean a microprocessor-controlled process that operates in a semiintegrated way upon relatively broad areas of a pixel array (in contrast to the small-scale mapping that is of interest in our invention), to establish which primary or secondary colors will be used at each pixel location to create a desired or "input" image. This rendition process in effect represents a transform that is performed upon an entire desired image to create its representation or equivalent as an entire pixel array.

Most typically the rendition process actually executed by a programmed microprocessor may become particularly elaborate when the desired hues of the input image are relatively subtle washes. Such hues are just slightly removed from primaries and secondaries—rather than midway between a primary and a secondary, or actually equal to a primary or secondary.

In such instances the rendition program labors continuously to inject just the right amounts of the available primary and secondary colors needed to represent the tinges of minor components that create such subtle effects—and to make these minor-element injections in a reasonably well-distributed and consistent way, to avoid creating a perception of either mottled or erratic color artifacts.

Various algorithms are used to accomplish this. One group of such protocols creates a sort of continuous-dilution phenomenon in the pixel array. What is continuously diluted is color itself.

In these processes the program finds the best single primary—or secondary-color approximation to a desired color at each given pixel—and then determines what the resulting error is there. Then in subsequent (usually nearby) pixels the program attempts to compensate for that error while at the same time expressing the colors that are desired in those (subsequent) pixels. It is in keeping with the continuous-color-dilution character of these algorithms that they are known by the apt term "error diffusion".

In the prior art, such large-scale multipixel integration of color representation has been employed only for representing complex colors, or for automatically matching arbitrarily selected colors in input images—even though in operation these sometimes mayturnouttobe primaries or secondaries—and for dealing with errors already accumulated along the way in the representation process.

Alternative to this large-scale multipixel rendition process are smaller-scale plural—or multiple-pixel arrays such as used by Sakurada or Lowe to provide hues efficiently—in terms of computational time—but perhaps not as accurately for complex colors as the rendition process.

Lowe's superpixels permit selection of hues that are primary colors, such as cyan, magenta and yellow, and also other hues that are individual secondaries such as blue, green and red—but these six hues are only half of a total of twelve of which the system is capable, and in addition three double-intensity forms of the primaries are also provided. Thus the Lowe system is not in essence a postrendition process for binary expression of preestablished individual primaries and secondaries exclusively.

Media effects

In color printing with thermal-inkjet pens, inkdrop volume and colorant concentration for each of the three primary inks are usually designed to give the correct spot size and color saturation on the most commonly used printing medium—namely, paper. When these same pens are used to print on other media such as transparency film or glossy media, however, the spot size and color saturation may not be optimum.

For example, another printer commercially available from the Hewlett Packard Company under the model designation PaintJet®, when used to print onpaper, ejects one drop per pixel for primary colors (cyan, magenta and yellow) and two for secondaries (green, blue and red). In other words, the ratio of quantity of secondary to quantity of primary is substantially 2:1. We say "substantially" because as will be understood ink drops from different pens are not necessarily identical in volume, and as a practical matter need not be; in any event, to put the same statement in a less general way, the number of drops of secondary ink to number of drops of primary ink stands in the ratio 2:1.

These treatments produce good hue and chroma, as well as satisfactory appearance on a lightness-darkness scale, on paper. When used on transparency film, however, these same treatments produce primary colors that appear under-saturated, or in familiar terms "washed out".

To improve color saturation of colors printed on transparency film, the PaintJet® system operates in a special transparency-printing mode which applies two drops per pixel for both primary and secondary colors—in other words, here the ratio is 2:2. Related techniques for satisfactorily implementing such a strategy are discussed in U.S. Pat. No. 4,943,813 to Palmer and Morris.

The teachings of that patent are representative of modern methods for inkjet printing on transparency film. Those teachings resolve the problem of multiple dot over-printing—and closely adjacent printing—by providing a time delay between successive passes to reduce dripping and improve inking uniformity.

Application of two drops per pixel for all primaries and secondaries, a 2:2 ratio, for transparency film is far superior to the 2:1 relationship that is optimum when used on paper. Nevertheless it does leave some room for refinement: we have noticed that to most viewers both red and green appear slightly undersaturated if printed in this way on transparency film.

This is especially significant in regard to modern printer products because—among other well-known considerations—red is if anything the most important single commercial color, and at the same time one for which casual observers tend to have a particularly critical eye.

Another, more serious, problem arises in color printing on other glossy media. In particular some popular printing materials have a glossy coating, somewhat like transparency stock, but also an opaque backing.

Such a printing medium is commercially important because of the added visual snappiness or flashiness which it can lend to a finished product. Exemplary products include commercial announcements, posters, and covers for comb-bound books. In this case the 2:2 ratio has been found satisfactory for green and blue, but red appears badly undersaturated.

As can now be seen, important aspects of the technology which is used in the field of the invention are amenable to useful refinement, which the prior art has failed to provide.

SUMMARY OF THE DISCLOSURE

The present invention introduces such refinement. The invention of the parent application is a prerendition system that permits limiting the total volume of ink specified in image data for each pixel, and thereby for an entire page, through linear reduction or scaling of source image data.

That linear reduction or scaling is with respect to a preset (default) or user-set maximum. Preferably the scaling is also with respect to a similarly preset or user-set threshold—which is to say, each input value is scaled linearly between the threshold and maximum values, to prevent liquid-inking overload.

The parent-application system does, however, call for nonintegral ink-density values, which under some circumstances are greater than one. In this regard it particularly relates to the subject matter of this document.

The present invention is a postrendition system; it has three main facets or aspects. To an extent which will shortly be clear, these three principal facets of the invention can be employed independently, to obtain their respective benefits; they are also, however, amenable to employment together in concert to optimize printed results by their beneficial interactions.

In preferred embodiments of a first one of these aspects or facets, the present invention is a method of printing chromatic color images by binary construction from individual ink drops deposited in pixel arrays. The method includes the step of establishing at least one certain primary or secondary chromatic color that is binary-printed as a predetermined, fixed number of drops of ink which exceeds two drops per pixel.

By "binary" once again we refer to the "go/no-go" concept mentioned in an earlier section of this document. Thus this step establishes that a particular color is substantially always—when using a particular printing medium—printed using a number of drops of ink that is (a) more than two, and (b) the same number.

The method also includes the step of receiving information about a given desired image to be printed on a given printing medium. In addition the method includes the step of determining for each particular pixel, in the given desired image on the given printing medium, a specific desired primary or secondary chromatic color.

In preferred embodiments of this first facet or aspect of our invention, the method also includes the step of applying to that particular pixel, or one or more closely associated pixels, said predetermined, fixed number of drops which exceeds two drops of ink per pixel. (We will shortly explain—when we come to the second major aspect of the invention—what we mean by "associated" pixels.) This step is performed only if the specific desired primary or secondary is one which it has been established is printed as a number of drops of ink exceeding two drops of ink per pixel.

The foregoing may be a description or definition of the first aspect of the present invention in its broadest or most general terms. Even in such general or broad forms, however, as can now be seen this facet of the invention resolves the previously outlined problems of the prior art.

In particular by laying down more colorant in a portion of an image than heretofore, spot size and saturation are increased. This in turn has the additional benefit of expanding the available color gamut to permit more accurate hue representations in complex colors.

It might be supposed that people skilled in the field of color printing by ink-drop-in-pixel representations would turn very naturally and promptly to a three-drop treatment for certain colors—as a sort of extension of the two-drop treatment known for transparencies. Actually the contrary is the case, for several reasons, as our own efforts illustrate.

When we first came upon the idea of using more than two drops in a pixel, we immediately were concerned about the ink-volume problems elaborated in the Palmer and Morris '813 patent mentioned earlier. Although interpass delays as described in that patent importantly moderate the adverse effects of relatively heavy inking, the "natural" step of advancing from two to three drops of ink represents a fifty-percent increase in the amount of ink laid down.

Thus a first consideration that dissuaded us from using more than two drops was that adding enough delay for satisfactory drying of this very large additional ink volume could require unacceptably large cumulative interpass delay. In other words the total printing time would be too long.

A second and major factor was that, within acceptable interpass-delay settings, we found excessive color-to-color bleed, excessive offset (color transfer to adjacent sheets of the medium when stacked), or generally excessive drying time for the finished product—or combinations of all these problems. A particularly onerous difficulty was encountered in what is sometimes called "blocking": a quantity of undried ink that is so large as to cause adjacent sheets to stick together.

A third problem that initially turned us away from over-two-drop-per-pixel inking was that the amount of ink applied necessarily equals the amount of ink consumed. In consequence, ink cartridges run out of ink and must be replaced more frequently, a source of user annoyance in itself. Moreover the overall cost of printer operation rises with the number of ink cartridges installed and emptied per unit of operating time.

For these reasons we were very reluctant to resort to additional ink-drop quantities; and instead turned to exploration of other possible strategies in increased dye loading of some inks. Only after extensive fruitless effort were these alternatives abandoned because of the difficulty of finding any single set of ink compositions that could be made usable with regular paper and transparencies and other glossy media.

At that point yet a fourth consideration came into play, deterring us from deciding to raise the number of ink drops per pixel above two. Our initial efforts to print red using three drops per pixel on a glossy medium produced unacceptable hue.

Two yellow drops and one magenta drop yielded a very light orange-red. On the other hand, two magenta and one yellow produced a somewhat dark red—which could be described simply as "too magenta".

At that juncture, however, with some pleasant surprise we hit upon ways of applying more than two drops of ink which overcame these difficulties and provided an excellent solution to the hue/gamut problem with completely satisfactory interpass delay, drying time, blocking and bleed. Those techniques include the other two facets or aspects of our invention, which also are preferred modes of practice of this first aspect now under discussion.

In particular we consider it very strongly preferable to apply increased numbers of ink drops not for all colors, or even all secondaries as in the prior art—but rather only to particular, specific secondaries which require such treatment for acceptable hue or saturation, or both, on specific media. This preferred embodiment alone represents a major, very significant moderation in the total amount of ink laid down and thereby in all the problems of overinking discussed above.

Thus for instance in one preferred embodiment of this first aspect of the invention we apply three drops of ink to produce red on transparency stock. Those preferably are one drop of yellow and two of magenta—which as previously noted produce unacceptable hue on other glossy media, but which we have found very satisfactory on transparency film.

We do not prefer to use this same quantity of ink for the other secondaries on transparencies. In particular, we have introduced means of stepping up the amount of ink not by an integral number of drops per pixel but by only a fractional increment. This further mitigates the hue-accuracy problems—for green, for example, by splitting the difference between "too bluish-green" and "too yellowish-green", inasmuch as a fractional number can be selected to virtually pinpoint the desired hue.

For instance in transparencies we are able—and we prefer—to print green by, in effect, 2.5 drops of ink: 1.5 of cyan and one of yellow. Similarly in transparencies we are able and we prefer to print blue by 1.5 drops of cyan and one of magenta.

On other glossy media we prefer and we are able to print red effectively by 2.5 drops, namely 1.5 of magenta and one of yellow. In this case, green and blue are preferably printed in a more-conventional fashion using one drop of yellow or magenta, respectively, plus one of cyan.

We prefer to employ this first aspect of our method in a three-bit-binary color-reproduction system; more specifically, we use the binary construction for each of three independent chromatic inks. As mentioned earlier, multidrop primaries have been used as part of multibit, multilevel inking systems, but heretofore neither for binary systems nor for three-bit systems.

In this context we also prefer that the determining step include resolving chromatic information about the given desired image at said particular pixel into the three-bit-color system, incorporating influence from other pixels nearby—and selecting exactly one single primary or secondary color for printing at said particular pixel. We thus prefer that the applying step be exclusive of printing any other primary or secondary color at that particular pixel.

In preferred embodiments of a second one of these aspects or facets, the present invention again is a method of printing chromatic color images on different printing media by construction from individual ink drops deposited in pixel arrays. The method is particularly for use in printing on different printing media that have the property of producing respective different chromatic color appearances in response to application of ink—even when ink of the same colors is applied in the same quantities, The method of this second facet of the invention includes the step of establishing at least one certain primary or secondary chromatic color, but no other hue, that receives a postrendition treatment which we shall call "superpixel" treatment for at least one printing medium. The meaning of the term "superpixel" is analogous to its usage in the Lowe patent, but will be further elaborated momentarily.

Relative to the Sakurada patent and the Lowe patent, the step described above is a departure in that it relates to preparation for a postrendition treatment—rather than a form of rendition, or a rendition substitute—but also in that this step relates to primary and secondary colors exclusively. Thus this step does not relate to using superpixel treatment to directly produce any other hue, such as for example a complex color such as brown; and is not part of a hue-on-demand type of system.

The method also includes the steps of receiving information about a given desired image to be printed on a given printing medium; and through a rendition process determining for each particular pixel, in the given desired image on the given printing medium, a specific desired primary or secondary chromatic color.

If the specific desired primary is one which it has been established receives postrendition superpixel treatment on the given medium, then the method also includes these substeps:

defining a superpixel that consists of a plurality of pixels associated with said particular pixel, and applying to each of the pixels in that superpixel, on the given printing medium, a respective number of drops of ink predetermined for the desired primary or secondary in conjunction with the given printing medium.

This last "applying" substep is the part of the process most plainly performed after rendition—the actual binary application of ink in individual pixels.

The foregoing may be a description or definition of the second facet of our invention in its broadest or most general terms. As with the first aspect of the invention, however, even in such general or broad forms—as can now be seen—this facet of the invention constitutes an important advance in removing the obstacles that heretofore restricted performance of prior-art economical printers.

In particular the postrendition superpixel treatment opens the way to providing much greater precision in both hue and saturation of printed chromatic secondaries, and therefore in available gamut for reproduction of complex chromatic colors. It does this by introducing a greater number of degrees of freedom for accommodation of diverse printing-medium response to inking, relative to prior-art postrendition binary treatment.

The representation of colors—even a single secondary color—on a variety of printing media is fundamentally a multidimensional problem. The prior art sought to resolve this problem with a severely restricted parameter set, or in other words an overly limited number of degrees of freedom. To say the same thing in still another way, perhaps more nearly in layman's language, the prior art provided relatively little flexibility in refining or adjusting hue and saturation of primary and secondary chromatic colors, in postrendition processing.

No longer is it necessary to struggle against the limitations imposed by that previous restriction. With this second facet or aspect of the present invention, additional degrees of freedom can be brought to bear in more finely tuning the relative proportions of primaries used to represent each chromatic secondary.

If desired it would be possible, in principle, to exploit this additional freedom (or "flexibility") in other ways. For instance, additional chromatic primaries, or combinations of primaries, could be introduced into the overall ink-usage strategies—each in its own suitably defined proportions—in order to refine certain chromatic secondaries (or primaries) for either esthetic or economic objectives.

Plural—or multiple-pixel arrays have not heretofore been used for postrendition binary representation of individual chromatic primaries or secondaries to print chromatic images. As mentioned in an earlier section of this document, large-scale multipixel integration of chromatic color representation has been employed in the prior art only for printing complex colors, and for dealing with errors already accumulated along the way in the process of such printing; and small-scale plural—or multiple-pixel integration has been employed in the prior art for multilevel and/or hue-on-demand systems.

Although this facet of the invention thus provides very significant advances relative to the prior art, nevertheless for greatest enjoyment of the benefits of the invention it is preferably practiced in conjunction with certain other features or characteristics which enhance its benefits.

For example, it is preferred that the method further include, for each medium to be used, the step of determining whether the specific desired chromatic primary or secondary is one which it has been established receives postrendition superpixel treatment.

It is also preferred that the superpixel consist of the particular pixel—that is to say, the target pixel—and at least one other nearby pixel. It is further preferable that the superpixel consist of said particular pixel and at least one other adjacent pixel.

More particularly we prefer that the superpixel consist of the particular target pixel and three other adjacent pixels. Many kinds Of pixel arrays can be used—for instance, a linear array, or a two-by-three rectangular array of six pixels, or a grouping of five pixels, etc. For present purposes, however, we find it satisfactory to use a superpixel that is a two-by-two cluster of pixels.

Further for this case we prefer that the number of ink drops applied in pixels at opposite corners of the cluster be the same, for both opposite-corner pairs; and that all four pixels in each superpixel are inked. More particularly still, it is preferable that the specific desired primary or secondary color be a secondary color; and that:

each of two opposite corners of the cluster receive one drop of ink of a first primary color and one drop of ink of a second primary color, and each of two other opposite corners of the cluster receive one drop of ink of the first primary color and two drops of ink of the same second primary color.

(By the terminology "first" and "second" primary colors we do not mean to suggest that one or the other primary ink is received first, or second. To the contrary, in principle the two inks can be received on the printing medium in either sequence; and we intend the nomenclature "first primary" and "second primary" in this document—and particularly as found in certain of the appended claims—to be so interpreted. As is known to people skilled in this field, however, hue and therefore the desired ink constituencies and relative proportions will vary with sequence; therefore it is normally important to make the sequence consistent or to vary proportions with sequence to obtain the correct hue.)

By virtue of this arrangement, for the superpixel considered as a unit the average quantity of the second primary color applied is 1.5 drops. The average quantity of all colors applied is 2.5 drops.

We prefer to implement our invention in the environment of a new printer product of the Hewlett Packard Company—a very-high-throughput device capable of six very fast printing passes. In this context, we use yellow as the first primary color.

Then if the given printing medium is a glossy medium, the color that receives superpixel treatment is red, and the second primary color is magenta. If, however, the given printing medium is transparency film, then we prefer that two colors receive superpixel treatment: green, in which instance the second primary color is cyan; and blue, in which case the first primary is magenta and the second cyan.

It is not necessary to express—or indeed to apply—our invention in terms of drops of ink as such; or in terms of geometrically simple or symmetrical patterns or their resulting very elementary fractions such as one-half. Various other modes of implementation are within the scope of certain of our appended claims.

Thus the invention is equally well seen as encompassing any arrangement in which each of at least one pixel of the superpixel receives a predetermined quantity of ink of a first primary color and at least the same quantity of ink of a second primary color; and in which each of at least one other pixel of the cluster receives substantially the same quantity of ink of the first primary color and substantially at least twice that same quantity of ink of said second primary color;

By such arrangements a great variety of fractional values can be obtained. For cost-effectiveness purposes we prefer that fractions be developed in such a way as to provide visually meaningful variations from the prior-art one-pixel/ one-drop systems.

Thus we prefer that for the superpixel considered as a unit the average quantity of the second primary color applied be substantially at least 1.2 times the predetermined quantity of ink for the first primary. This corresponds to a preference that the average quantity of all colors applied to represent a single secondary be substantially at least 2.2 times that same predetermined quantity of ink.

Our invention is not, however, limited to development of such values. For example, for special purposes proper fractions (values less than one)—or fractional values within even 0.1 of integral numbers—can be developed as well.

For best economics and performance we also prefer that the method of this second facet or aspect of our invention further comprise the step of establishing at least one certain primary or secondary color that does not receive superpixel treatment for at least one printing medium. In this same context, if the specific desired primary or secondary is one which it has been established does not receive superpixel treatment for said given printing medium, then we prefer that the method also include applying to that particular pixel individually, in the given image on the given printing medium, a number of drops of ink predetermined for the desired primary or secondary in conjunction with the given printing medium.

This preference is significant. As mentioned earlier the use of incremented inking above two drops per pixel for all colors tends to produce needless added interpass time, finished-product drying time, and yet still a significant risk of objectionable bleed and blocking.

In preferred embodiments of a third aspect or facet of our invention, the invention is a method of printing color images by construction from individual ink drops deposited in pixel arrays. The method includes the step of establishing at least one certain primary or secondary color that is printed as, in effect, a nonintegral number of ink drops—the nonintegral number being greater than one.

The method also comprises the steps of receiving information about a given desired image to be printed on a given printing medium; and determining for each particular pixel, in the given desired image, a specific desired primary or secondary color. If the specific desired primary is one which it has been established is printed as, in effect, a nonintegral number, greater than one, of drops, then the method proceeds to an additional step of applying to that particular pixel effectively a nonintegral number, greater than one, of drops of ink predetermined for the desired primary or secondary.

This foregoing description may represent the broadest or most general description or definition of the third aspect or facet of our invention. Even in this broad general form it can be seen to make a significant contribution to resolving previously discussed problems of the prior art.

For example, in addition to various benefits already discussed in relation to the superpixel aspects of our invention, nonintegral-drop usage has the distinct benefit—in comparison with using the next higher integral value for a particular primary-color quantity—of saving very significant quantities of ink. Pen life can be extended materially, for instance, but printing 2.5 drops for red rather than 3.0 drops.

Here again, however, for optimum enjoyment of the benefits of this third facet of the invention there are some distinctly preferable modes of practice. In particular we prefer that the applying step comprise applying a respective integral number of drops of ink to each pixel in a plurality of pixels associated with that particular pixel—that is, a superpixel as introduced above. The respective integral numbers preferably are at least one for each pixel, and at least two for at least one pixel of the plurality; as a result, over the plurality of pixels the average number of drops of ink per pixel exceeds one and is nonintegral.

We prefer that the plurality of pixels further comprise at least one pixel that is nearby—and more preferably adjacent to—the particular pixel. We also prefer that the superpixel consist of the "particular" pixel and three other adjacent pixels; and as noted earlier we prefer to use a two-by-two cluster, with the number of drops applied in pixels at opposite corners of the cluster being the same. The proportions indicated as preferable in connection with the second facet of our invention are correspondingly preferable in conjunction with this third facet.

All of the foregoing operational principles and advantages of the present invention will be more fully appreciated upon

DETAILED DESCRIPTION OF THE PREFERRED EMBODIMENTS

Figures 1, 2, 3B, 3G, 4, 5, 6, 7:
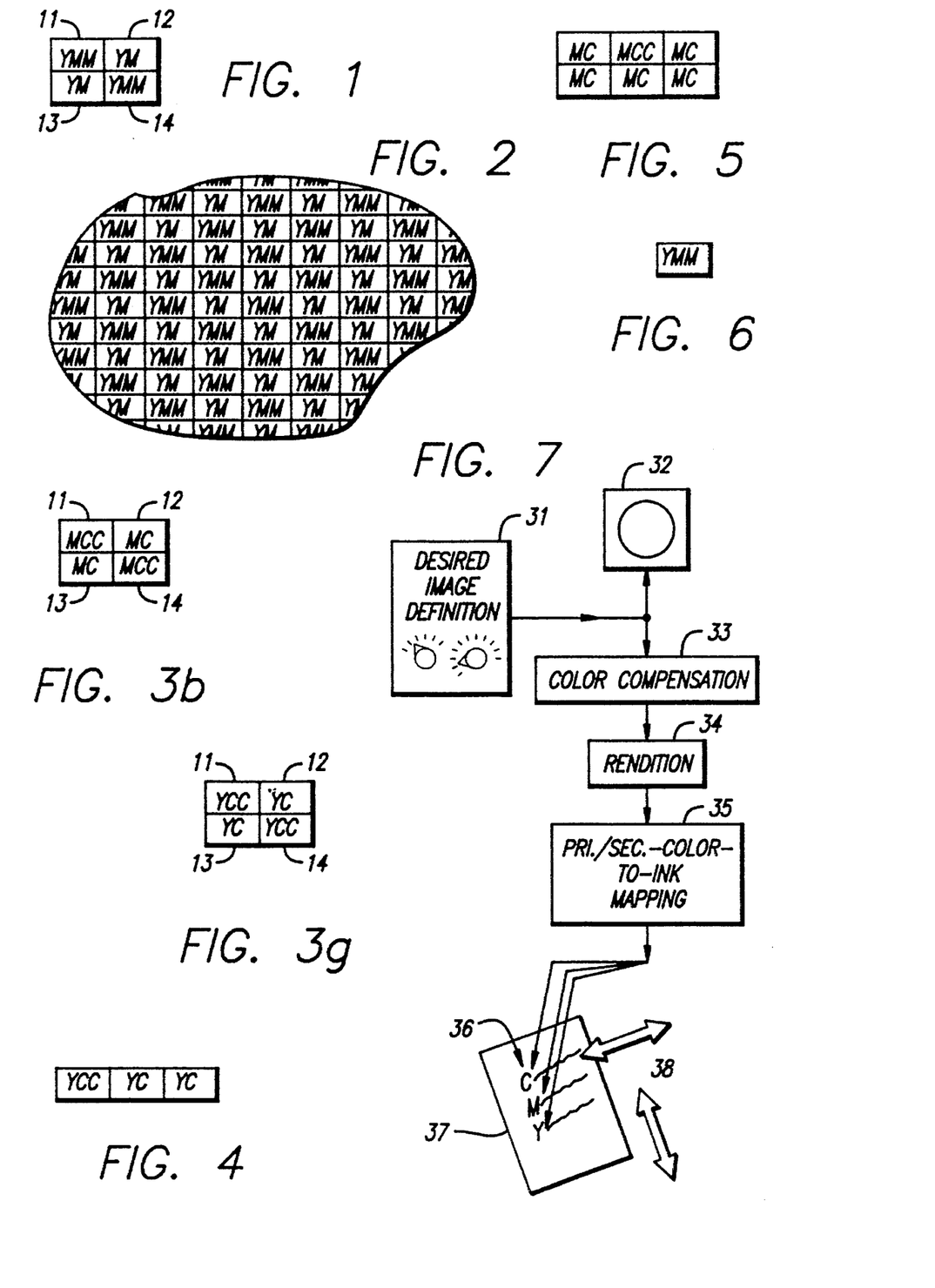
FIG. 1 is a pixel-array diagram showing a preferred two-by-two superpixel structure as used for printing red on a glossy medium.
FIG. 2 is a pixel-array diagram showing the FIG. 1 superpixel structure and usage as part of a larger pixel matrix.
FIGS. 3*b* and 3*g* are diagrams like FIG. 1 and showing the same structure—but as used for printing blue and green, respectively, on a transparent medium.
FIG. 4 is another pixel-array diagram showing an alternative linear superpixel structure.
FIG. 5 is still another pixel-array diagram showing another alternative superpixel structure.
FIG. 6 is a representation of a single pixel as used for printing red on a transparent medium.
FIG. 7 is a block diagram showing the portion of a printing apparatus in which the method of the present invention operates.

FIG. 1 illustrates a particularly preferred embodiment of our invention which incorporates all three of its main aspects or facets. Here a superpixel is used to provide a number of drops per pixel which is both nonintegral and larger than two.

This structure as used in the manner specifically illustrated in FIG. 1 is particularly advantageous for printing red on glossy media. Each letter "Y" and "M" shown inside each cell or pixel location 11 through 14 of the superpixel represents a single drop of yellow or magenta ink respectively.

Thus the pixels at opposite corners 11 and 14, 12 and 13 of this superpixel are inked identically. More specifically, one pair of opposite-corner pixels 12, 13 receives one drop per pixel of yellow and magenta ink; whereas the other opposite-corner pixel pair 11, 14 receives one drop per pixel of yellow but two of magenta.

Accordingly, considering the inking over the super-pixel as a whole, the average number of drops per pixel for a first primary (yellow) is one, and for a second primary (magenta) is one and a half (1.5). The average number of drops, without regard to color, is therefore two and a half (2.5).

Expressed in terms of relative quantities, and taking all drops as substantially the same size, the average quantity of the second primary is one and a half (1.5) times the average quantity of the first primary. In other words the system uses a 1.5:1 ratio of primary quantities.

Now when the superpixel shown in FIG. 1 is used to fill a field—that is to say, some extended-area portion of an image, which portion is desired to appear red—the basic superpixel structure is repeated in both orthogonal directions, checkerboard fashion. FIG. 2 shows the result.

This is in a sense the most common case, since it may be relatively rare for any color to be printed at only a single isolated pixel. In the instance of such an isolated pixel, and along the edges of a field as well, the precise proportions of the primaries employed are of relatively much less importance—because the visual angle subtended by an isolated pixel, or an edge as such, is intrinsically very small and therefore inconspicuous.

For all such circumstances we thus prefer to simply provide some arbitrary rule or rules for establishing how the pattern is cut off geometrically, if it is a repetitive pattern as in FIG. 2—or what ink proportions are used in an individual pixel if what is called for is in fact an isolated pixel. One such rule that could be applied for both cases is to make the first, leading pixel 11 in a corner of such a field (and an isolated pixel as well) as "YM", and to allow the last or trailing pixels along all edges of the field to be whichever pattern—"YM" or "YMM"—happens to fall in those positions.

We do not favor that particular rule, because at least under unusual circumstances it could lead to undesirable overconcentrations or underconcentrations of magenta in certain patterns. Such effects can arise as interference effects when the periodicity of a small feature of an input image happens to be closely related to the periodicity within the superpixel.

A very different candidate for a superpixel-printing rule is to print alternating rows of two-drop and three-drop cells. We experimented with this kind of implementation and found it unsatisfactory: it produced a conspicuous layered or rowed effect which was quite unnatural and unpleasant to most of our observers.

The technique we prefer is to use the checkerboard superpixel pattern mentioned above, and to establish, in a virtual sense, that pattern over the entire image area—that is to say, over the entire pixel array. This is readily done simply by specifying, for example, that every odd pixel in every odd row, and every even pixel in every even row, is a "YM"; and every remaining pixel is a "YMM".

Then whenever the rendition stage calls for red on a glossy printing medium (other than transparency film), in a particular pixel, the system simply utilizes that underlying or virtual pattern as a template or specification of what to print in that particular pixel. This permits unambiguous determination of the desired inking for even an isolated single pixel, and may minimize the likelihood of color moire patterns and like interference-derived effects.

Again, the checkerboard itself is is always fixed relative to the overall image or page, not the data. Although this mode of implementation is not perfect, and sometimes the checkerboard effect itself can be seen, we consider this mode much better than all alternatives which we tested.

In the language common to the color industry, in our system both the glossy and transparency modes use a six-pass, one-third-density-per-pass print mode, completing 100% density after the third pass and 200% density after the sixth. This print mode uses ninety-six nozzles of the pen, and advances sixteen nozzles per pass.

Internally to the microprocessor operation, our two-primary-drop pixels—within nonintegral-drop superpixels—are produced by first assigning three primary drops to all the pixels of the superpixel, and then stripping a bit from specified three-primary-drop pixels. Our system always performs any such data stripping (to obtain fewer than three drops in a single pixel) after the third pass; therefore the system always applies at least one drop of each primary that is to be used.

FIGS. 3*g* and 3*b* show how the same principle can be used in optimizing the printing of green and blue, respectively, on transparency film. As before, opposite-corner pairs 11 and 14, 12 and 13 are treated the same—but now for green (FIG. 3*g*) the second primary is cyan ("C") rather than magenta.

The preferred opposite-corner treatment is also analogous for blue, but in this instance the first primary is magenta and the second cyan. For filling a field, both these superpixel utilizations (FIGS. 3b and 3g) are repeated, analogously to the arrangement of FIG. 2.

The accompanying table describes the drop combinations which we prefer for all eight possible pixel colors.

A four-pixel grid is shown merely to demonstrate the alternating-strip checkerboard—where it is used.

| desired color | four pixel sample | after third pass | glossy medium after sixth pass | transparency after sixth pass | notes |
|---|---|---|---|---|---|
| white | W W<br>W W | — | — | — | — |
| cyan | C C<br>C C | C C<br>C C | CC CC<br>CC CC | CC CC<br>CC CC | primaries are 2-drop (200%; no stripping) |
| magenta | M M<br>M M | M M<br>M M | MM MM<br>MM MM | MM MM<br>MM MM | primaries are 2-drop (200%; no stripping) |
| yellow | Y Y<br>Y Y | Y Y<br>Y Y | Y Y Y Y<br>Y Y Y Y | Y Y Y Y<br>Y Y Y Y | primaries are 2-drop (200%; no stripping) |
| red | R R<br>R R | YM YM<br>YM YM | YMM YM<br>YM YMM | YMM YMM<br>YMM YMM | glossy: 250%, alternate strip; transparency: 300%, strip Y |
| green | G G<br>G G | YC YC<br>YC YC | YC YC<br>YC YC | YCC YC<br>YC YCC | glossy: 200%, strip both Y and C; transparency: 250%, alternate strip |
| blue | B B<br>B B | MC MC<br>MC MC | MC MC<br>MC MC | MCC MC<br>MC MCC | glossy: 200%, strip both C and M; transparency: 250%, alternate strip |
| black | K K<br>K K | K K<br>K K | K K<br>K K | KK KK<br>KK KK | glossy: 100%, stripped; transparency: 200%, not stripped. |

Equal opposite-corner usage is not a requirement of this system. In fact, for other dye loadings in the inks it could be entirely reasonable to have three "YCC" pixels and only one "YC" pixel in each superpixel, yielding an average 1.75:1 rather than 1.5:1 ratio of cyan to yellow. As will be clear to those skilled in this field, entirely different hue relationships will be produced if ink compositions are held unchanged.

Alternatively one "YCC" pixel could be used for each three "YC" pixels, for a 1.25:1 ratio corresponding to a red intermediate in orangeness between the hues obtained with 1:1 and 1.5:1 respectively. Still other options include three "YC" pixels and one "Y" pixel, providing a cyan-to-yellow ratio of 4:3 or 1.33:1 with lower saturation. In the context of different dye loadings, a system can equally well support proper-fractional values—as for example through use of three "YC" pixels and one "C" pixel, yielding a 3:4 or 0.75:1 ratio of cyan to yellow, a shade entirely different from those suggested above.

FIG. 4 illustrates that a superpixel can be formed with a pseudo-one-dimensional or in any event linear structure. Here a 1:33.1 magenta-to-yellow ratio is produced in a three-cell superpixel, with one cell used as "YCC" and the other two filled with "YC"; the result is four units of cyan to three of yellow, 4:3=1.33.1. Reversing the relative number of these two usages (inking two cells as "YCC" and one as "YC") gives a 5:3 or 1.67:1 ratio.

FIG. 5 illustrates a six-cell superpixel that can be used to yield interprimary ratios such as 1.17:1, 1.83:1 etc. (with total number of drops averaging 2.17, 2.83 etc. respectively), usable for various dye-loading environments in conjunction with various media.

FIG. 6 for definiteness illustrates our preferred inking for red on transparencies. One yellow and two magenta drops, represented as "YMM", produce a red hue that is improved in relation to that obtained from the "YM" application used in the earlier printer discussed above.

FIG. 7 shows how the color-to-ink mapping system of our invention fits into the larger scheme of operation of a color printer. As seen, an image source 31 (which may include a color-matching function as suggested by the presence of a video monitor 32) feeds an optional color-compensation stage 33.

Signals from the stage next enter the rendition module 34. Finally the rendition stage drives our primary/secondary-color-to-ink mapping system 35, which in turn fires the pens 36 to apply ink to the paper 37. The pens 36 are driven mechanically relative to the paper 37 in two orthogonal directions (one of which may be effected by motion of the paper 37 if preferred), as represented in the drawing by the two double-headed arrows 38.

As described in some of the aforementioned related patent documents, color compensation and rendition are advantageously but not necessarily integrated. Such an integrated system optionally can take into account and even incorporate the operations of our primary/secondary-color-to-ink mapping system as well.

Figure 8:
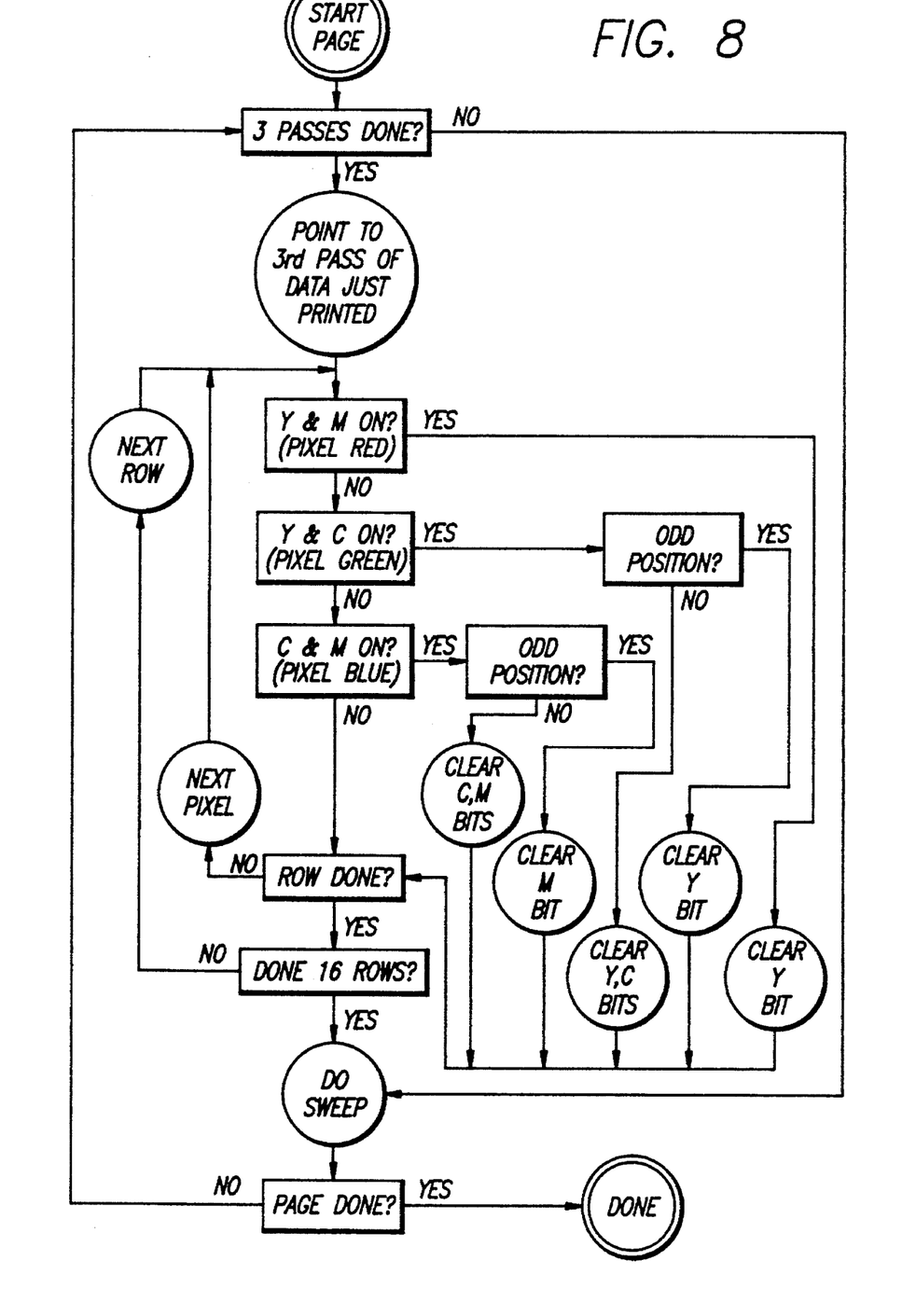
FIG. 8 is a flow chart illustrating operation of the present invention in a printing system.

FIG. 8 represents the decision-making processes performed by a programmed digital microprocessor in the automated practice of our invention. A particularly central function of this algorithm is the above-mentioned data stripping to implement the cell-inking tabulation presented earlier.

With the foregoing text as orientation, this diagram will be self explanatory to a person skilled in the field of programming firmware programming. It will be particularly clear to a person skilled in such programming for operation of pixel-array color printers.

In selecting the specific inking proportions—or as we sometimes call them, color printing "modes"—introduced above, we took into account several kinds of available data. These data included complete color-space information for each trial, subjective opinions on how the colors looked, and printing done at low temperature to accentuate undesirable banding and low optical density.

We used both user and diagnostic plots. As the quantitative results suggest, red was the most difficult color to adequately represent for good saturation. (Some workers in the color industry would express this in the terminology "the most difficult color to fully deplete".) In fact we were not able to fully saturate red on transparencies even at three drops per pixel; additional ink could be applied for this purpose, but we consider use of three drops to be the optimum cost-effective tradeoff.

After extensive testing we have found that these print modes provide an excellent compromise between (1) printing and drying times and (2) blocking, bleed, color transfer and ink usage. Among other favorable results is good mileage from each pen before ink exhaustion.

It will be understood that the foregoing disclosure is intended to be merely exemplary, and not to limit the scope of the invention—which is to be determined by reference to the appended claims.

What is claimed is:

1. A method of printing color images by binary construction from individual ink drops deposited in pixel arrays; said method comprising the steps of:
    establishing at least one certain primary or secondary chromatic color that is binary-printed as a predetermined, fixed number of drops of ink which exceeds two drops per pixel, said at least one primary or secondary chromatic color being fewer than all primary and secondary colors that are printed;
    receiving information about a given desired image to be printed on a given printing medium;
    determining for each particular pixel, in the given desired image on the given printing medium, a specific desired primary or secondary chromatic color;
    if the specific desired primary or secondary chromatic color is one which said establishing step has established is printed as more than two drops of ink per pixel, then applying to that particular pixel or one or more closely associated pixels said predetermined, fixed number of drops which exceeds two drops of ink per pixel; and
    if the specific desired primary or secondary chromatic color is not one which the establishing step has established is printed as more than two drops of ink per pixel, then applying to that particular pixel no more than one drop of ink for a primary chromatic color, or two drops of ink for a secondary chromatic color.

2. The method of claim 1, particularly for use in a three-bit-binary color-reproduction system using said binary construction for each of three independent chromatic inks, and wherein:
    the determining step comprises resolving chromatic information about the given desired image at said particular pixel into said three-bit-color system, incorporating influence from other pixels nearby, and selecting exactly one single primary or secondary color for printing at said particular pixel; and
    said applying step is exclusive of printing any other primary or secondary color at that particular pixel.

3. The method of claim 2, wherein:
    said predetermined, fixed number of drops is three; and
    the applying step comprises applying three drops of ink in that particular pixel.

4. The method of claim 3, wherein:
    the establishing step establishes that red is printed as more than two drops of ink; and
    the applying step comprises printing red as one drop of yellow ink and two drops of magenta ink.

5. A method of printing chromatic color images by binary construction from individual ink drops deposited in pixel arrays, particularly for use in a three-bit-binary color-reproduction system using said binary construction for each of three independent chromatic inks; said method comprising the steps of:
    establishing at least one certain primary or secondary chromatic color that is binary-printed as a predetermined, fixed number of drops of ink which exceeds two drops per pixel;
    receiving information about a given desired image to be printed on a given printing medium;
    determining for each particular pixel, in the given desired image on the given printing medium, a specific desired primary or secondary chromatic color; and
    if the specific desired primary or secondary chromatic color is one which the establishing step has established is printed as more than two drops of ink per pixel, then applying to that particular pixel or one or more closely associated pixels said predetermined, fixed number of drops which exceeds two drops of ink per pixel; and wherein:
    said predetermined, fixed number of drops is nonintegral; and
    the applying step comprises applying a nonintegral number of drops of ink, on the average, over a cluster of pixels associated with that particular pixel; said nonintegral number being larger than two.

6. A method of printing chromatic color images on different printing media by construction from individual ink drops deposited in pixel arrays; said different printing media having the property of producing respective different color appearances in response to application of ink, even when ink of the same colors is applied in the same quantities; said method comprising the steps of:
    establishing at least one certain primary or secondary chromatic color, but no other hue, that receives postrendition superpixel treatment for at least one printing medium;
    receiving information about a given desired image to be printed on a given printing medium;
    through a rendition process determining for each particular pixel, in the given desired image on the given printing medium, a specific desired primary or secondary chromatic color, but no other hue; and
    if the specific desired primary or secondary chromatic color is one which the establishing step has established receives postrendition superpixel treatment for the given printing medium, then:
        defining a superpixel that consists of a plurality of pixels associated with said particular pixel, and
        applying to each of the pixels in that superpixel, on the given printing medium, a respective number of drops of ink predetermined for the desired primary or secondary chromatic color in conjunction with the given printing medium.

7. The method of claim 6, further comprising:

determining, for each medium to be used, whether the specific desired primary or secondary chromatic color is one which receives superpixel treatment.

8. The method of claim 6, wherein the superpixel consists of:

said particular pixel; and at least one other nearby pixel.

9. The method of claim 6, wherein the superpixel consists of:

said particular pixel; and three other adjacent pixels.

10. The method of claim 9, wherein:

the superpixel is a two-by-two cluster of pixels.

11. The method of claim 10, wherein:

the number of ink drops applied in pixels at opposite corners of the cluster is the same, for both opposite corner pairs; and all four pixels in each cluster are inked.

12. The method of claim 11, wherein:

the specific desired primary or secondary color is a secondary color;

each of two opposite corners of the cluster receives one drop of ink of a first primary color and one drop of ink of a second primary color; and each of two other opposite corners of the cluster receives one drop of ink of the first primary color and two drops of ink of said second primary color;

whereby for the superpixel considered as a unit the average quantity of said second primary color applied is 1.5 drops, and the average quantity of all colors applied is 2.5 drops.

13. The method of claim 12, wherein:

if the given printing medium is a nontransparent glossy medium, then said first primary color is yellow and said at least one color that receives superpixel treatment is red and said second primary color is magenta; and if the given printing medium is transparency film, then said at least one color that receives superpixel treatment comprises:

green, for which said first primary color is yellow and said second primary color is cyan, and blue, for which said first primary color is magenta and said second primary color is cyan.

14. The method of claim 6, wherein:

each of at least one pixel of the superpixel receives a predetermined quantity of ink of a first primary color and at least the same quantity of ink of a second primary color; and each of at least one other pixel of the cluster receives substantially the same quantity of ink of the first primary color and substantially at least twice that same quantity of ink of said second primary color;

wherein for the superpixel considered as a unit the average quantity of said second primary color applied is substantially at least 1.2 times said predetermined quantity of ink, and the average quantity of all colors applied is substantially at least 2.2 times said predetermined quantity of ink.

15. The method of claim 6, further comprising the steps of:

establishing at least one certain primary or secondary color that does not receive superpixel treatment for at least one printing medium; and if the specific desired primary or secondary chromatic color is one which it has been established does not receive superpixel treatment for said given printing medium, then applying to that particular pixel individually, in the given image on the given printing medium, a number of drops of ink predetermined for the desired primary or secondary chromatic color in conjunction with the given printing medium.

16. A method of printing chromatic color images by construction from individual ink drops deposited in pixel arrays; said method comprising the steps of:

establishing at least one certain primary or secondary chromatic color that is printed as, in effect, a nonintegral number of ink drops, said nonintegral number being greater than one;

receiving information about a given desired image to be printed on a given printing medium;

determining for each particular pixel, in the given desired image, a specific desired primary or secondary chromatic color; and if the specific desired primary or secondary chromatic color is one which the establishing step has established is printed by, in effect, a number of drops that is nonintegral and greater than one, then applying to that particular pixel effectively a nonintegral number, greater than one, of drops of ink predetermined for the desired primary or secondary chromatic color.

17. The method of claim 16, wherein:

the applying step comprises applying a respective integral number of drops of ink to each pixel in a plurality of pixels associated with that particular pixel, said respective integral number being: at least one for each pixel, and at least two, for at least one pixel of the plurality;

whereby, over the plurality of pixels, the average number of drops is greater than one and nonintegral.

18. The method of claim 17, wherein:

the plurality of pixels further comprises at least one pixel that is nearby the particular pixel.

19. The method of claim 17, wherein:

the plurality of pixels further comprises at least one pixel that is adjacent to the particular pixel.

20. The method of claim 17, wherein the superpixel consists of:

said particular pixel; and three other adjacent pixels.

21. The method of claim 17, wherein:

the superpixel is a two-by-two cluster of pixels.

22. The method of claim 21, wherein:

the number of drops applied in pixels at opposite corners of the cluster is the same.

23. The method of claim 21, wherein:

the specific desired primary or secondary color is a secondary color;

each of two opposite corners of the cluster receives a predetermined quantity of ink of a first primary color and substantially the same quantity of ink of a second primary color; and each of two other opposite corners of the cluster receives substantially the same quantity of ink of the first primary color and substantially twice that quantity of ink of said second primary color;

whereby for the superpixel considered as a unit the average quantity of said second primary color applied is 1.5 times said predetermined quantity, and the average quantity of all colors applied is 2.5 times said predetermined quantity.

24. The method of claim 17, wherein:

the specific desired primary or secondary color is a secondary color;

each of two pixels of the plurality of pixels receives a predetermined quantity of ink of a first primary color and substantially the same quantity of a second primary color; and each of two other pixels of the plurality of pixels receives substantially the same quantity of ink of the first primary color and substantially twice that quantity of ink of said second primary color;

whereby for the plurality of pixels considered as a unit the average quantity of said second primary color applied is substantially 1.5 times said predetermined quantity, and the average quantity of all colors applied is substantially 2.5 times said predetermined quantity.

* * * * *